US012801998B2

(12) United States Patent
Sharma et al.

(10) Patent No.: US 12,801,998 B2
(45) Date of Patent: Nov. 17, 2026

(54) METHODS AND SYSTEMS FOR CONTINUOUS REDUCTION OF MODEL DISPARITY

(71) Applicant: JPMORGAN CHASE BANK, N.A., New York, NY (US)

(72) Inventors: Shubham Sharma, New York, NY (US); Freddy Lecue, Mamaroneck, NY (US); Nicolas Marchesotti, London (GB); Mallik Bivor, West Chester, PA (US); FengQin Zhao, West Chester, PA (US); Daniele Magazzeni, London (GB); David K. Heike, Toronto (CA)

(73) Assignee: JPMorgan Chase Bank, N.A., New York, NY (US)

( * ) Notice: Subject to any disclaimer, the term of this patent is extended or adjusted under 35 U.S.C. 154(b) by 521 days.

(21) Appl. No.: 18/526,032

(22) Filed: Dec. 1, 2023

(65) Prior Publication Data

US 2025/0181966 A1 Jun. 5, 2025

(51) Int. Cl.
*G06N 20/00* (2019.01)

(52) U.S. Cl.
CPC .................................... *G06N 20/00* (2019.01)

(58) Field of Classification Search
CPC ...................................................... G06N 20/00
See application file for complete search history.

(56) References Cited

U.S. PATENT DOCUMENTS

| | | | | |
|---|---|---|---|---|
| 12,321,839 | B1 * | 6/2025 | Merrill | G06N 20/00 |
| 2022/0366333 | A1 * | 11/2022 | Lollo | G06F 16/3344 |
| 2024/0394598 | A1 * | 11/2024 | Livne | G06N 20/00 |
| 2024/0428133 | A1 * | 12/2024 | Merrill | G06N 20/00 |
| 2025/0181966 | A1 * | 6/2025 | Sharma | G06N 20/00 |
| 2025/0322464 | A1 * | 10/2025 | Harnach | G16H 20/00 |

FOREIGN PATENT DOCUMENTS

| | | | | | |
|---|---|---|---|---|---|
| CN | 113016003 | A * | 6/2021 | | G06N 20/00 |
| CN | 119129752 | A * | 12/2024 | | G06F 9/505 |
| CN | 114764824 | B * | 2/2025 | | H04N 13/239 |
| WO | WO-2023276022 | A1 * | 1/2023 | | G06V 10/94 |

* cited by examiner

*Primary Examiner* — Hassan Mrabi
(74) *Attorney, Agent, or Firm* — Guntin & Gust, PLC; Kenneth S. Kwan

(57) ABSTRACT

Aspects of the subject disclosure may include, for example, comparing a first disparity of an all-feature model with a second disparity of a baseline model, and based on the comparing, performing feature swap-out processing or feature swap-in processing with respect to a baseline feature set associated with the baseline model to derive a model having a third disparity, and performing feature addition processing or feature removal processing with respect to features used to train the model to derive an alternative model that has a determined acceptable performance and a determined acceptable disparity. Other embodiments are disclosed.

20 Claims, 12 Drawing Sheets

200

150

200

| Example | Feature 1 | Feature 2 | Feature 3 | Feature 4 |
|---|---|---|---|---|
| Mean SHAP Group ‘A’ (var,protected) | 0.1 | - 0.05 | 0.02 | -0.1 |
| Mean SHAP Group ‘W’ (var,control) | - 0.1 | 0.05 | 0.02 | -0.2 |
| DPA | 0.2 | -0.10 | 0 | 0.1 |
| Summary | Bad feature for Group ‘A’ | Good feature for Group ‘A’ | Depends on swap-out limit | Bad feature for Group ‘A’ |

FIG. 2B

| Example dataset: CARS 4.0 | AUC (%) (the higher the better) | Change in AUC (the lower the better) | Disparity (%) (the higher the better) | Change in Disparity (the higher the better) |
|---|---|---|---|---|
| Baseline | 86.923 | - | -2.442 | - |
| All-feature | 86.936 | -1.3 | -2.455 | -1.3 |

FIG. 2C

| Example dataset: CARS 4.0 | AUC (%)<br>(the higher the better) | Change in AUC<br>(the lower the better) | Disparity (%)<br>(the higher the better) | Change in Disparity<br>(the higher the better) |
|---|---|---|---|---|
| **Baseline** | 86.923 | - | -2.442 | - |
| Low Disparity Model | 86.419 | 50.4 | -1.987 | 45.5 |

FIG. 2D

| Example dataset: CARS 4.0 | AUC (%)<br>(the higher the better) | Change in AUC<br>(the lower the better) | Disparity (%)<br>(the higher the better) | Change in Disparity<br>(the higher the better) |
|---|---|---|---|---|
| **Baseline** | 86.923 | - | -2.442 | - |
| **Candidate model 1** | 86.685 | 23.8 | -2.073 | 36.9 |

FIG. 2E

| Example dataset: CARS 4.0 | AUC (%) (the higher the better) | Change in AUC (the lower the better) | Disparity (%) (the higher the better) | Change in Disparity (the higher the better) |
|---|---|---|---|---|
| Baseline | 86.923 | - | -2.442 | - |
| Candidate model 2 | 86.696 | 22.7 | -2.0162 | 42.5 |

FIG. 2F

| Example dataset: CARS 4.0 | AUC (%) (the higher the better) | Change in AUC (the lower the better) | Disparity (%) (the higher the better) | Change in Disparity (the higher the better) |
|---|---|---|---|---|
| Baseline | 86.923 | - | -2.442 | - |
| Candidate model 3 | 86.779 | 14.4 | -2.058 | 38.4 |

FIG. 2G

| Example dataset: CARS 4.0 | AUC (%) (the higher the better) | Change in AUC (the lower the better) | Disparity (%) (the higher the better) | Change in Disparity (the higher the better) |
|---|---|---|---|---|
| Baseline | 86.923 | - | -2.442 | - |
| Hyperparameter tuned model | 86.841 | 8.6 | -2.006 | 42.9 |

FIG. 2I

METHODS AND SYSTEMS FOR CONTINUOUS REDUCTION OF MODEL DISPARITY

FIELD OF THE DISCLOSURE

The subject disclosure relates to methods and systems for continuous reduction of model disparity.

BACKGROUND

Explainable artificial intelligence (XAI) refers to methods or processes that allow human users to understand and trust the outputs or predictions of machine learning (ML) algorithms. These methods or processes help characterize various aspects of a model, including, but not limited to, its potential biases (or fairness) and accuracy, which can be useful in determining if the system is working as expected.

BRIEF DESCRIPTION OF THE DRAWINGS

Reference will now be made to the accompanying drawings, which are not necessarily drawn to scale, and wherein:

FIG. 2B is a table showing example computed mean SHapley Additive exPlanations (SHAP) values and disparity per attribute (DPA) values for an example protected group (Group 'A') and a control group (Group 'W').

FIG. 2C is a table showing relative performance and disparity between an example trained baseline model and an example trained all-feature model, where the disparity of the all-feature model is worse than that of the baseline model.

FIG. 2D is a table showing relative performance and disparity between the example trained baseline model and an example trained low disparity model, where the disparity of the low disparity model is better than that of the baseline model.

FIG. 2E is a table showing relative performance and disparity between the example trained baseline model and a first candidate model, where the disparity of the first candidate model is slightly worse than that of the low disparity model, but where the performance of the first candidate model is better than that of the low disparity model.

FIG. 2F is a table showing relative performance and disparity between the example trained baseline model and a second candidate model, where the second candidate model has further improved performance relative to the first candidate model.

FIG. 2G is a table showing relative performance and disparity between the example trained baseline model and a third candidate model, where the third candidate model has further improved performance relative to the second candidate model.

FIG. 2I is a table showing relative performance and disparity between the example trained baseline model and a final hyperparameter tuned model.

DETAILED DESCRIPTION

Figure 1:
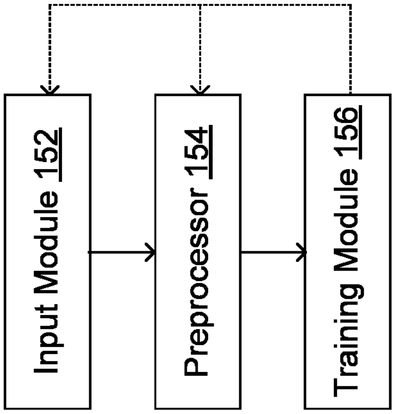
FIG. 1 is a block diagram of an example, non-limiting embodiment of an AI architecture in accordance with various aspects described herein.

As regulations continue to push for more trustworthiness in AI development and implementation, deployed models need to be adjusted to correct for model characteristics associated with responsible AI. Models are generally required to perform on many dimensions, including disparity, where the selection of different features for training the models can lead to different insights and predictions. In existing model development, where feature selection is performed with respect to one model performance characteristic (e.g., accuracy), subsequent feature selection for other objectives, such as those with respect to secondary model performance characteristics (e.g., fairness and/or robustness), would generally require the computationally expensive selection process to be performed again from scratch.

The subject disclosure describes illustrative embodiments of a method (or swap engine/algorithm) that is capable of facilitating feature reselection, where features may be (e.g., efficiently) selected with respect to secondary model performance characteristics, even after a feature selection process has been performed with respect to a primary objective. In exemplary embodiments, the algorithm may employ a staged approach to achieving disparity and performance objectives—e.g., by first reducing disparity and then improving performance. For instance, in some embodiments, the algorithm may perform a feature swap-out procedure to derive a low disparity model and subsequently perform a feature addition procedure to derive a good performing, low disparity model. This contrasts with the otherwise inefficient process of solving for both disparity and performance objectives at the same time. Various details of swap-out and swap-in flows of the algorithm, including which flow is used (and when) depending on model disparity, are further described below.

In one or more embodiments, the algorithm may leverage SHapley Additive explanations (SHAP) values (and, optionally, correlation analyses) to approximate predictions of models. The algorithm may also provide group-based explanations (e.g., for all-feature model(s)) that give insight into the features that are most responsible for disparity. In various embodiments, the algorithm may be capable of performing explanations-guided searching that (e.g., continuously) identifies models based on acceptable model performance (e.g., prediction accuracy) and/or disparity targets or tolerances, which allows for (e.g., continuous) reduction in disparity while maintaining performance.

Using SHAP values to determine the average effect of a feature on the prediction by a model (and, optionally, clustering/grouping of redundant or related features), as described herein, effectively reduces the search space of feature combinations, which provides for improved substitute analysis (SA) over existing methods, such as Monte Carlo Tree Search (MCTS). The number of models that needs to be trained can also be reduced, which conserves model development time as well as computing resources and power resources. One skilled in the art would readily recognize that exemplary embodiments of the feature reselection algorithm provide a scalable approach to model development and refinement. Exemplary embodiments of the algorithm also provide flexible overall disparity evaluation, such as average unfavorable disparity (or weighted average disparity) across different groups, as desired. Overall, it will be readily apparent that the algorithm is necessarily tied to ML systems and provides the practical application of model disparity reduction.

One or more aspects of the subject disclosure include a device, comprising a processing system including a processor, and a memory that stores executable instructions that, when executed by the processing system, facilitate performance of operations. The operations may include comparing a first disparity of an all-feature model with a second disparity of a baseline model, wherein the all-feature model is trained using an all-feature set that includes a plurality of features, and wherein the baseline model is trained using a baseline feature set that includes a subset of the plurality of features. The operations may further include, based on the comparing, performing feature swap-out processing or feature swap-in processing with respect to the baseline feature set to derive a model having a third disparity, and performing feature addition processing or feature removal processing with respect to features used to train the model to derive an alternative model that has a determined acceptable performance, a determined acceptable disparity, or both.

One or more aspects of the subject disclosure include a non-transitory machine-readable medium, comprising executable instructions that, when executed by a processing system including a processor, facilitate performance of operations. The operations may include comparing a first disparity of an all-feature model with a second disparity of a baseline model. The operations may further include, based on the comparing, performing feature swap-out processing or feature swap-in processing with respect to a baseline feature set associated with the baseline model to derive a model having a third disparity, and performing feature addition processing or feature removal processing with respect to features used to train the model to derive an alternative model that has a determined acceptable performance and a determined acceptable disparity.

One or more aspects of the subject disclosure include a method. The method may include comparing, by a processing system including a processor, a first disparity of a feature model with a second disparity of a baseline model, wherein a number of features associated with the feature model is greater than a number of features associated with the baseline model. The method may further include, based on the comparing, performing, by the processing system, feature swap-out processing or feature swap-in processing with respect to the features associated with the baseline model to derive a model having a third disparity, performing, by the processing system, feature addition processing or feature removal processing with respect to features used to train the model to derive a candidate model that has determined acceptable performance, determined acceptable disparity, or both, and causing, by the processing system, the candidate model to undergo hyperparameter tuning to derive an alternative model to the feature model.

FIG. 1 is a diagram of an example AI architecture 150 in accordance with various aspects described herein. As shown in FIG. 1, the AI architecture 150 may include an input module 152, a preprocessor 154, and a training module 156. Some or all of these modules, which may be referred to as programs, processors, or agents, may be realized based on execution of instructions or data by one or more processors of a computing (or ML) system, such as the computing (or ML) system 400 of FIG. 4 (described in more detail below). In various embodiments, the AI architecture 150 may be used to facilitate continuous reduction of model disparity.

The input module 152 may allow for input of (e.g., user-provided) data, such as datasets, parameters, etc., that can be used to train models and/or obtain predictions from models. In some cases, datasets may be labeled and may include inputs (e.g., observed or measured values) and known output data. Labeled datasets may facilitate supervised (or guided) learning. Although not shown, the AI architecture 150 may include a library of ML models or algorithms, such as, for instance, one or more classifiers (e.g., a naïve Bayes classifier or the like), one or more support vector machines, one or more artificial neural networks, one or more learned decision trees, and so on. Each of the ML algorithms may be associated with various parameters.

The preprocessor 154 may be equipped with one or more preprocessing algorithms that are configured to prepare input datasets for processing by the training module 156. Such preprocessing may include discretization (where values are binned or converted into nominal values), component analysis, data estimation, feature selection, feature extraction (e.g., dimensionality reduction, data removal, statistical analysis, threshold-based filtering, etc.), data interpolation, and/or the like.

The training module 156 may be configured to train and evaluate ML models. As an example, the training module 156 may be configured to perform unsupervised learning and/or supervised learning based in input datasets. In exemplary embodiments, the training module 156 may be capable of training and/or evaluating the performance of multiple models in parallel. In one or more implementations, the training module 156 may, despite operating on multiple ML models in parallel, train and evaluate the various ML models individually. In some implementations, the training module 156 may be capable of combining the procedure outcomes of multiple models to derive an aggregate outcome. Model evaluation or validation may involve a comparison of model outputs to known outputs or an analysis of model outputs relative to desired metrics (e.g., relating to performance, disparity, etc.).

Although not shown, the AI architecture 150 may include additional functional modules, such as those for gathering performance results and presenting (e.g., displaying) data regarding the results. While various components, modules, etc. may have been illustrated in FIG. 1 as separate components, modules, etc., it will be appreciated that multiple components, modules, etc. can be implemented as a single component, module, etc., or a single component, module, etc. can be implemented as multiple components, modules, etc. Additionally, functions described as being performed by one component, module, etc. may be performed by multiple components, modules, etc., or functions described as being performed by multiple components, modules, etc. may be performed by a single component, module, etc.

As briefly discussed above, exemplary embodiments of an algorithm facilitate feature reselection, where features may be efficiently selected with respect to secondary model performance characteristics, even after a feature selection process has been performed with respect to a primary objective. One goal may be to efficiently search for at least one alternative ML model that provides acceptable performance and has lower disparity with respect to a baseline model.

An all-feature model is one that is trained on all of the features in a dataset or feature set (also referred to herein as an "all-feature set"). A baseline model is one that is trained on only a subset of the features in the dataset (also referred to herein as a "baseline set," "baseline features," or "baseline feature set"), with the goal of performance (e.g., based on metrics, such as accuracy, Area Under the Receiver Operating Characteristic curve (AUC), etc.) and with minimal to no considerations as to disparity. Disparity can, for instance, provide a measure of fairness. However, it will be understood and appreciated that disparity can be used to provide measures of other types of differences, inequity, or the like. Alternative models that exemplary embodiments of the algorithm might develop may be trained using different subsets of features (i.e., different from the baseline feature set). As will be seen in the description below with respect to FIG. 2A, the different subsets of features may be identified in accordance with two input characteristics, namely a performance-related parameter and a disparity-related parameter.

Figure 2A:
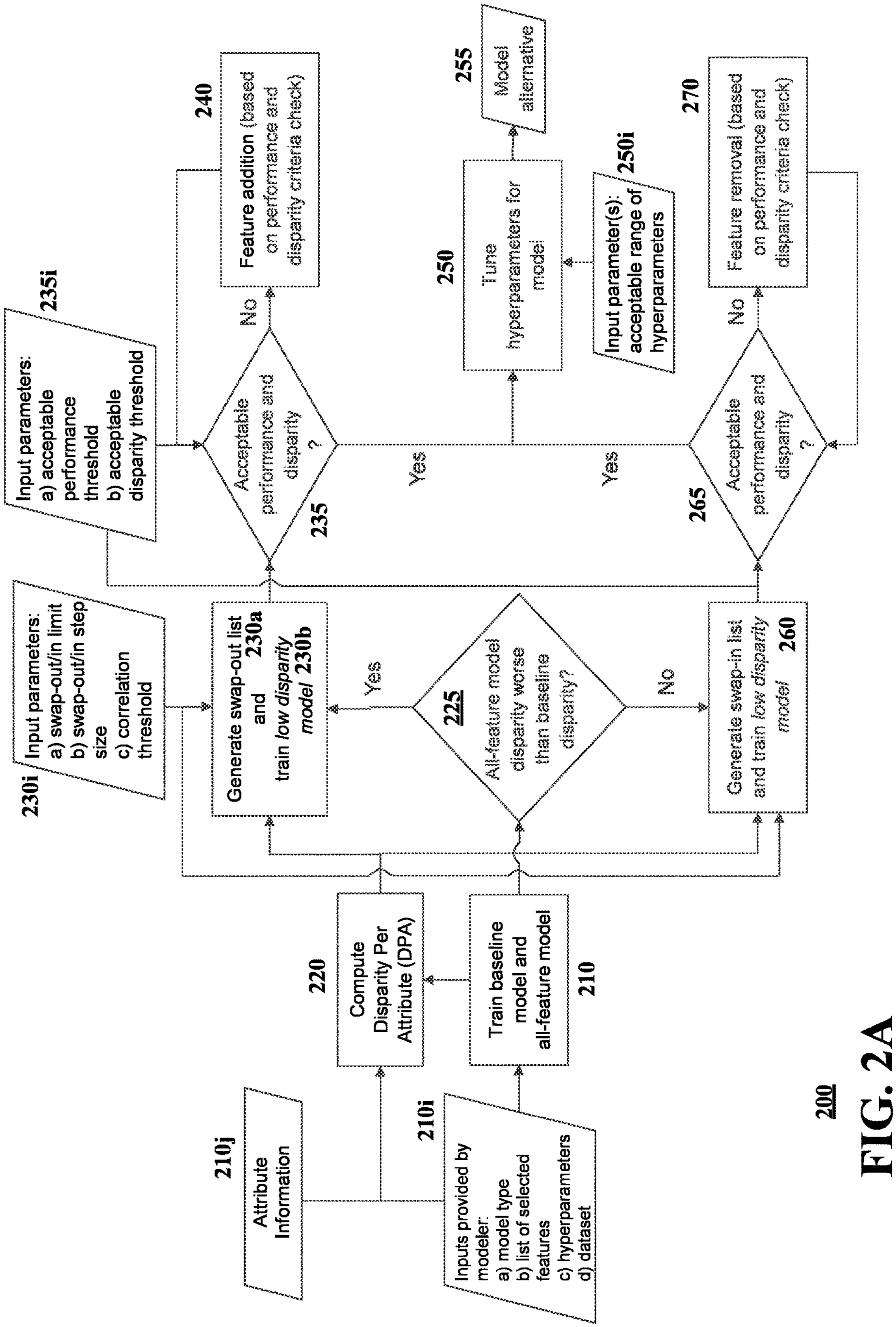
FIG. 2A is a flow diagram of an example, non-limiting embodiment of a feature reselection algorithm in accordance with various aspects described herein.

FIG. 2A is a flow diagram 200 of an example, non-limiting embodiment of a feature reselection algorithm in accordance with various aspects described herein. In exemplary embodiments, some or all of the steps shown in FIG. 2A may be performed using the AI architecture 150 of FIG. 1.

At 210, the algorithm may cause a baseline model and an all-feature model to be trained. As shown by reference number 210*i*, the algorithm may obtain inputs provided by a modeler (e.g., a human user/administrator or an autonomous computer-based model manager), and cause a baseline model and an all-feature model to be trained based on some or all of the inputs. The inputs may, for example, include instructions or information regarding desired model type(s) (e.g., classification, regression, clustering, decision making, etc.), dataset(s) containing feature information, listing(s) of selected features (e.g., one list identifying the features to be used to train the baseline model and/or another list identifying the features to be used to train the all-feature model), hyperparameter(s) (e.g., parameter(s) that need to be adjusted in order to obtain the best values for model weights), and/or the like. An example dataset may include a total of 268 features, where all 268 features may be used to train the all-feature model, and where only 120 of the 268 features may be used to train the baseline model.

At 220, the algorithm may compute disparity per attribute (or feature) (DPA) values. As depicted, this may involve the use of inputs 210*i* (e.g., select inputs, such as dataset(s)) as well as attribute information 210*j*. Generally speaking, attribute information 210*j* may include data regarding various groups of entities (e.g., people, things, etc.), such as their characteristics, activities or actions, and so on. For instance, in a loan approval context, attribute information may include government monitoring information (GMI), or more particularly, loan applicant demographic data (e.g., age, sex, marital status, race or national origin) that creditors are required to collect under certain regulations when consumers apply for certain loans. Any other type of information may be used as attribute information depending on the context.

For a given feature, calculation of its DPA may involve taking the difference between an importance of the feature for one sensitive attribute group versus an importance of the feature for another sensitive attribute group. In various embodiments, calculation of DPA may include computations of SHAP values for the trained all-feature model using the attribute information 210*j*. SHAP values are scores of how important each feature is for the prediction by the model. For instance, in a loan approval model, SHAP analysis might show how each applicant's income, credit history, and employment status contribute to the final decision. In one or more embodiments, the algorithm may use SHAP values to calculate DPA for different sensitive attributes. In this way, each set of sensitive attribute values (e.g., one race vs. another; one age group vs. another; etc.) may have a DPA score associated therewith. In exemplary embodiments, the DPA for a feature may be defined as:

$$DPA = \text{mean}^{SHAP}_{var,protected} - \text{mean}^{SHAP}_{var,control},$$

where var,protected is the group that has disparity against a var,control group. FIG. 2B is a table showing example computed mean SHAP values and DPAs for an example protected group (Group 'A') and a control group (Group 'W'). A SHAP value that is closer to 1.0 indicates that it is a "bad" feature for the protected group since it contributes to a "bad" outcome for the group. Referring to FIG. 2B, for instance, the SHAP value of 0.1 for Feature 1 indicates that the feature is negatively contributing for Group 'A'.

In some embodiments, the algorithm may (e.g., optionally) compute correlations between features. For instance, the algorithm may employ the Pearson Correlation Coefficient or any other measure of correlation to identify correlations between features. More generally, however, the algorithm may cluster or group features using any other measure of relationship. As described in more detail below, clustered/groupings of features (whether determined based on correlation or otherwise) can be useful during swap-out and/or swap-in flows.

Returning to FIG. 2A, at 225, the algorithm may determine whether the disparity of the all-feature model is worse than the disparity of the baseline model. The result of the determination at 225 may decide how the algorithm proceeds to identify alternative models. Specifically, in a case where the algorithm determines that the disparity of the all-feature model is worse than that of the baseline model (i.e., YES at 225), the algorithm may proceed to perform swap-out processing (230*a*, 230*b*). FIG. 2C is a table showing relative performance and disparity between an example trained baseline model and an example trained all-feature model, where the disparity of the all-feature model is worse than that of the baseline model. Specifically, the disparity of the all-feature model for Group 'A' vs. Group 'W' at −2.442% is worse than the disparity of the baseline model for Group 'A' vs. Group 'W' at −2.455%, by −1.3. It would be desirable to find an alternative model that has lower disparity relative to the baseline model. As described in more detail below, swap-out processing may be performed to help achieve this, by removing one or more disparity-contributing feature(s) from the baseline feature set, and causing the resulting lower disparity feature set to be used to train a lower disparity model. Swap-out thus essentially removes, from the baseline feature set, feature(s) that might worsen disparity for (e.g., cause more bias against) a protected group (e.g., Group 'A'), with a goal of deriving a low disparity model with minimal to no consideration as to performance (e.g., AUC). This reduces the subsequent problem to simple model performance improvement, which can be achieved by way of feature addition/hyperparameter tuning (e.g., with checks on disparity).

In a different case where the algorithm determines that the disparity of the all-feature model is not worse than (e.g., is better than or is equal to) that of the baseline model (i.e., NO at 225), the algorithm may proceed to perform swap-in processing (260). This may involve adding, to the baseline feature set, (e.g., low disparity) feature(s) in the all-feature set that were not originally in the baseline feature set, and causing the resulting low disparity feature set to be used to train a low disparity model. Swap-in thus essentially adds, to the baseline feature set, feature(s) that might reduce or improve disparity, or at least do not worsen disparity beyond a tolerance, for a protected group (e.g., Group 'A').

In exemplary embodiments, the swap-out list creation procedure (230*a*) performed by the algorithm may first include rank ordering features (e.g., all of the features in the all-feature set) based on their DPA scores. In particular, the algorithm may rank the features from worst DPA to best DPA. Then, the algorithm may iterate over the rank ordered set starting from the feature with the worst DPA. If a feature is in the baseline feature set, the algorithm may add that feature to a swap-out list. Otherwise, the algorithm may skip over that feature. The swap-out list may be used to derive a low disparity feature set by removing, from the baseline feature set, all of the features that are identified in the swap-out list. The algorithm can then cause the low disparity feature set to be used to train (230*b*) a low disparity model. FIG. 2D is a table showing relative performance and disparity between the example trained baseline model and an example trained low disparity model, where the disparity of the low disparity model is better than that of the baseline model. Specifically, the disparity of the low disparity model for Group 'A' vs. Group 'W' at −1.987% is better than the disparity of the baseline model for Group 'A' vs. Group 'W' at −2.442%, by 45.5.

In various embodiments, one or more input parameters may be used to control the swap-out procedure. These input parameter(s) may be provided by a modeler to facilitate focused searching for model(s) that meet the modeler's preferences or requirements. As shown by reference number 230*i* in FIG. 2A, the input parameter(s) may include, for instance, swap-out limit, swap-out step size, and/or correlation threshold. Swap-out limit is the maximum number of features that can be swapped out of the baseline feature set when performing steps 230*a*, 230*b*. Swap-out step size is the number of features that can be removed from the baseline feature set in each iteration, determined by the swap-out limit, to train different low disparity models. The correlation (or other relationship measure-based) threshold, which may be an optional input parameter, sets a correlation (or relationship measure-based) value over which two features may be deemed sufficiently related. In certain embodiments, a feature (e.g., any feature) that is, for instance, correlated with a given feature by greater than the threshold amount may also be added to the swap-out list during swap-out processing.

The following is a non-limiting example of how the algorithm may, in accordance with steps 230*a* and 230*b*, arrive at a low disparity model based on the input parameters 230*i*, particularly illuminating how the swap-out limit and swap-out step size parameters can dictate iterations involving steps 230*a* and/or 230*b*. Assume that the swap-out limit parameter is set to fifty, and the swap-out step size parameter is set to five. In this case, the algorithm may iterate over the aforementioned rank ordered set until the swap-out list contains fifty features. The algorithm may then remove, from the baseline feature set, the five worst DPA features in the swap-out list, and cause the resulting feature set to be used to train a first model. The algorithm may also remove, from the baseline feature set, the ten worst DPA features in the swap-out list, and cause the resulting feature set to be used to train a second model. The algorithm may perform similar steps to remove the fifteen worst DPA features, the twenty worst DPA features, all the way up to removing all fifty of the features in the swap-out list. As a result of steps 230*a*, 230*b*, the algorithm may cause ten models to be trained, where the model that has the lowest disparity may be selected as the low disparity model. As will be understood and appreciated, the number of models that might be trained as a result of iterations involving steps 230*a* and/or 230*b* may vary depending on the values of the various input parameters 230*i*.

At step 235 of FIG. 2A, the algorithm may determine if the low disparity model obtained in step 230*b* has acceptable performance and disparity. In a case where the low disparity model has acceptable performance and disparity, the algorithm may proceed to step 250 to tune hyperparameter(s) for the low disparity model so as to derive a final alternative model 255. In a different case where the low disparity model does not have acceptable performance and disparity, the algorithm may proceed to step 240 to iteratively perform feature addition and cause model training. For instance, while steps 230*a* and 230*b* may have provided a low disparity model, the swapping out of features that had to be done in order to arrive at such a model may have deteriorated model performance or accuracy. A goal at this point may thus be to improve model performance without a significant decline in disparity.

In various embodiments, one or more input parameters may be used in decision step 235. These input parameter(s) may be provided by a modeler to facilitate focused searching for model(s) that meet the modeler's preferences or requirements. As shown by reference number 235*i* in FIG. 2A, the input parameter(s) may include, for instance, an acceptable performance threshold and/or an acceptable disparity threshold.

An acceptable performance threshold may relate to satisfactory model performance. As an example, the acceptable performance threshold may define a minimum performance value. As another example, the acceptable performance threshold may define a maximum acceptable amount of underperformance relative to the baseline model. As yet another example, the acceptable performance threshold may define a minimum acceptable amount of performance improvement as the algorithm progresses between stages of feature addition in step 240 or from iteration to iteration of these stages of feature addition (described in more detail below with respect to step 240).

An acceptable disparity threshold may relate to satisfactory model disparity. As an example, the acceptable disparity threshold may define a maximum disparity value. As another example, the acceptable disparity threshold may define a maximum acceptable amount of worsening (or reduction) in disparity relative to the disparity of the low disparity model obtained in steps 230*a*, 230*b*. As yet another example, the acceptable disparity threshold may define a maximum tolerable worsening (or reduction) in disparity as the algorithm progresses between stages of feature addition in step 240 or from iteration to iteration of these stages of feature addition.

It will be understood and appreciated that the values and usage of any of the acceptable performance and disparity thresholds may vary depending on modeler preferences and/or objectives.

In exemplary embodiments, step 240 may be performed in stages of feature addition that can be iterated or repeated. These stages may involve feature set adjustments, causing models to be trained, and model performance/disparity checks.

For instance, in a first stage of step 240, the algorithm may, for features that were previously removed from the baseline features (i.e., steps 230*a*, 230*b*), add some or all of these features (e.g., each such feature) back individually, cause corresponding models to be independently trained, and check the models for performance and disparity (decision block 235). Doing so may yield a first candidate set of "good" features each of which, when added to the baseline feature set for training, results in a respective model that has improved performance and that does not reduce or worsen disparity beyond a tolerance amount. A new model (e.g., candidate model 1) may then be trained using this first candidate set of features and its performance and/or disparity may be checked (decision block 235). In a case where performance and disparity criteria are satisfied, the algorithm may proceed to step 250 for hyperparameter tuning. In a different case where performance and disparity criteria are not satisfied, the algorithm may proceed to a second stage of step 240. FIG. 2E is a table showing relative performance and disparity between the example trained baseline model and a first candidate model, where the disparity of the first candidate model is slightly worse than that of the low disparity model, but where the performance of the first candidate model is better than that of the low disparity model.

In a second stage of step 240, the algorithm may, for features that are not in the baseline feature set, add some or all of those features (e.g., each such feature) individually to the aforementioned first candidate set of features (i.e., obtained in the first stage of step 240), cause corresponding models to be independently trained, and check the models for performance and disparity (decision block 235). Doing so may yield a second candidate set of "good" features each of which, when added to the baseline feature set for training, results in a respective model that has improved performance and that does not reduce or worsen disparity beyond a tolerance amount. A new model (e.g., candidate model 2) may then be trained using this second candidate set of features and its performance and/or disparity may be checked (decision block 235). In a case where performance and disparity criteria are satisfied, the algorithm may proceed to step 250 for hyperparameter tuning. In a different case where performance and disparity criteria are not satisfied, the algorithm may iterate or repeat the first and/or second stages, one or more times, to derive a third candidate model, a fourth candidate model, and so on, until iterations are complete, after which the algorithm may proceed to step 250 with a final candidate model. In various embodiments, the iterations of the two stages may be repeated until improvements are no longer observed (e.g., based on targets set per acceptable performance and/or acceptable disparity). In certain embodiments, the iterations of the two stages of step 240 may be repeated a number of times up to an iteration limit defined in an iteration limit input parameter (e.g., provided by a modeler) or may be repeated so long as computing resource availability levels are satisfied. FIG. 2F is a table showing relative performance and disparity between the example trained baseline model and a second candidate model, where the second candidate model has further improved performance relative to the first candidate model. FIG. 2G is a table showing relative performance and disparity between the example trained baseline model and a third candidate model, where the third candidate model has further improved performance relative to the second candidate model. In this way, the two stages of feature addition (step 240) may not only address performance deterioration, but also resolve any uncertainty as to whether the mean SHAP difference between protected and control groups is a good or true measure of disparity per attribute/feature.

Figure 2H:
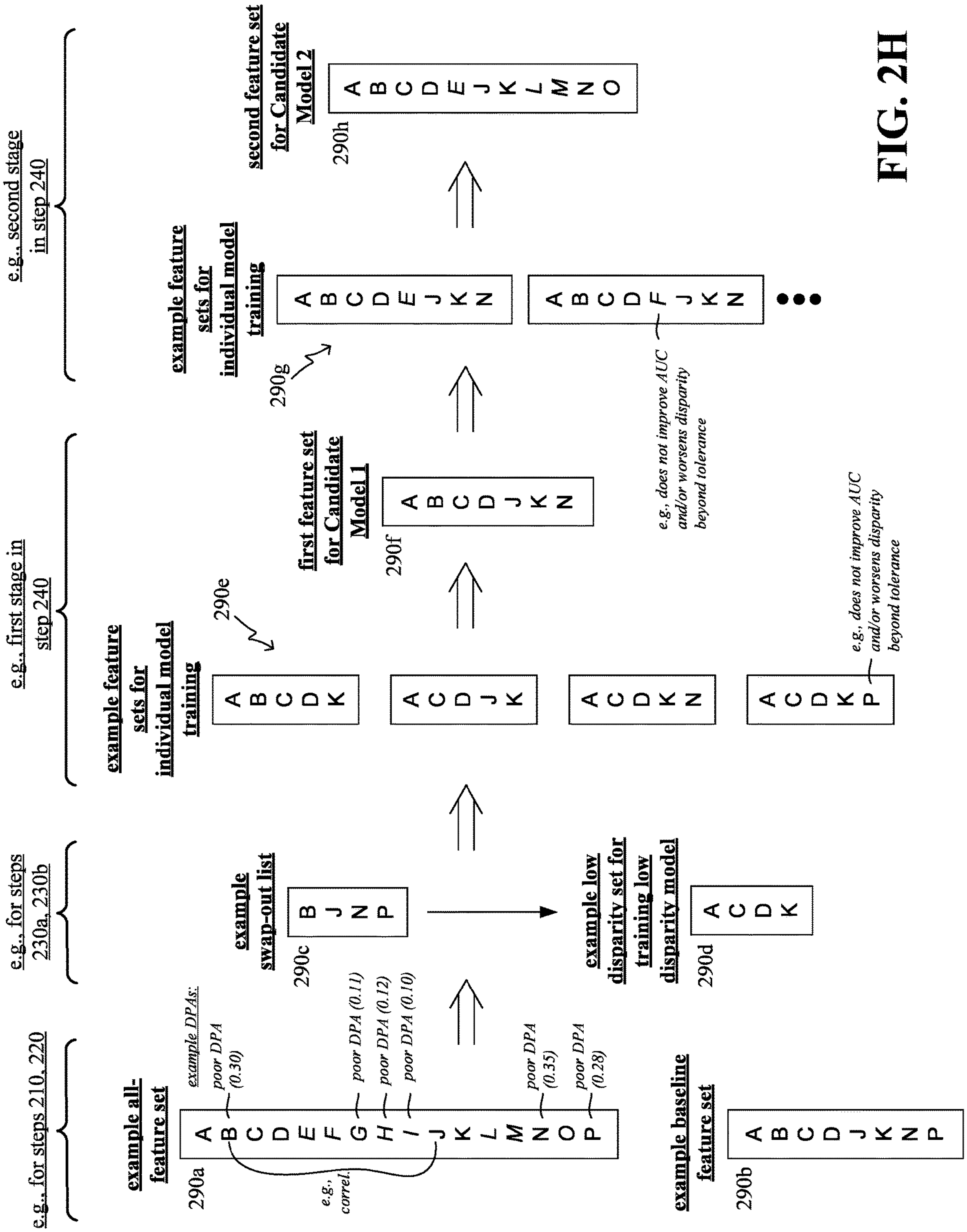
FIG. 2H shows a non-limiting example of feature set creation and model training, corresponding to particular steps in FIG. 2A, in accordance with various aspects described herein.

To further illustrate the two stages of feature addition in step 240, reference will now be made to FIG. 2H. FIG. 2H shows a non-limiting example of feature set creation and model training beginning from steps 210, 220 of FIG. 2A. Referring to FIG. 2H, at steps 210, 220, the algorithm may cause an all-feature model to be trained based on an all-feature set 290*a*, containing features A, B, C, D, E, F, G, H, I, J, K, L, M, N, O, and P, and may cause a baseline model to be trained based on a baseline feature set 290*b*, containing features A, B, C, D, J, K, N, and P. The algorithm may, at steps 230*a*, 230*b* create a swap-out list 290*c* that contains features B, J, N, and P, derive a low disparity feature set 290*d* that contains features A, C, D, K (i.e., by removing features B, J, N, and P from the baseline feature set 290*b*), and cause a low disparity model to be trained using the low disparity feature set 290*d*. In the first stage of step 240, the algorithm may derive individual feature sets 290*e* by individually adding back the features B, J, N, and P to the baseline feature set 290*b* that were removed in steps 230*a*, 230*b*, for independent training and performance/disparity criteria check. The algorithm may then form a first candidate feature set 290*f* by selecting those features that were added back which satisfied performance/disparity criteria checks—here, e.g., features B, J, and N—and adding them to the baseline feature set 290*b*. A first candidate model may then be trained using the first candidate feature set 290*f*. In the second stage of step 240, the algorithm may derive individual feature sets 290*g* by individually adding, to the first candidate feature set 290*f*, features that are not in the baseline feature set 290*b*—here, features E, F, etc., for independent training and performance/disparity criteria check. The algorithm may then form a second candidate feature set 290*h* by selecting those features that were added which satisfied performance/disparity criteria checks—here, e.g., features E, L, M, and O—and adding them to the baseline feature set 290*b*. A second candidate model may then be trained using the second candidate feature set 290*h*. As described above, iterations of the two stages of step 240 may be performed (e.g., in accordance with defined parameters, etc.) to obtain a model of acceptable performance for final hyperparameter tuning. At 250, the algorithm may tune hyperparameters for the given model, with a goal of improving (e.g., only) performance to arrive at alternative model 255. Hyperparameter input(s) 250*i* may, for instance, include hyperparameter(s) to be used and acceptable ranges for the hyperparameter(s). Hyperparameter tuning may be performed using any suitable technique, such as, for example, Bayesian optimization and/or the like. FIG. 2I is a table showing relative performance and disparity between the example trained baseline model and a final hyperparameter tuned model.

Referring back to FIG. 2A, and returning to decision block 225, in a case where the algorithm determines that the disparity of the all-feature model is better (or is at least not worse) than the disparity of the baseline model, the algorithm may proceed to step 260 for swap-in processing. The following is a brief description of the swap-in flow and feature removal flow, which, in some embodiments, may be a "mirror" of the pipeline for swap-out flow and feature addition flow, with a general aim of achieving acceptable performance and acceptable disparity. At 260, rather than swapping out features, the algorithm may instead swap in features for training a low disparity model. Computed DPAs (described above with respect to step 220) may be used to generate the swap-in list. Features with the best DPA may be preferable for swap in. For instance, iteration over a ranked ordered set of features based on DPA (e.g., from best DPA to worst DPA) may be performed similar to that described above with respect to swap-out processing, such that features (and optionally those that are correlated thereto) that are not in the baseline feature set may be added to the baseline feature set (e.g., in accordance with swap-in limit and step size) to arrive at a low disparity feature set for model training and performance/disparity checks. For swap-in processing, the input parameters 230*i* may be similar to those for swap-out processing, except that a swap-in limit and/or a swap-in step size may be used instead. Values of swap-out and swap-in limits may be the same or different depending on modeler preferences or requirements. Similarly, values of swap-out step size and swap-in step size may be the same or different depending on modeler preferences or requirements. At 265, where the performance and disparity of a low disparity model are determined to be acceptable, the algorithm may proceed to 250 for hyperparameter tuning, similar to that described above with respect to swap-out processing. Acceptable performance and disparity thresholds for swap-in processing (and feature removal processing in step 270) may be the same as or different from those for swap-out processing and feature addition processing. In a case where the low disparity model is not deemed acceptable, the algorithm may proceed to step 270 for feature removal processing. Here, in a first stage of step 270, rather than adding in features (like that in step 240 for feature addition), the algorithm may instead individually remove (prior swapped-in) features, and independently train corresponding models and perform performance/disparity checks. The algorithm may then form a first candidate feature set by selecting those features that, when a model is trained without them, satisfy performance/disparity criteria checks, and removing such features from the low disparity feature set. A first candidate model may then be trained using this first candidate feature set. In a second stage of step 270, the algorithm may derive individual feature sets by individually removing, from the first candidate feature set, features that are also in the baseline feature set, for independent training and performance/disparity criteria check. The algorithm may then form a second candidate feature set by selecting those features that, when a model is trained without them, satisfy performance/disparity criteria checks, and removing such features from the first candidate feature set. A second candidate model may then be trained using the second candidate feature set. Iterations of the two stages of step 270 may be performed (e.g., in accordance with defined parameters, etc.) to obtain a model of acceptable performance for final hyperparameter tuning.

It is to be understood and appreciated that, although one or more of FIGS. 1 and 2A-2I might be described above as pertaining to various processes and/or actions that are performed in a particular order, some of these processes and/or actions may occur in different orders and/or concurrently with other processes and/or actions from what is depicted and described above. Moreover, not all of these processes and/or actions may be required to implement the systems and/or methods described herein.

Figure 3:
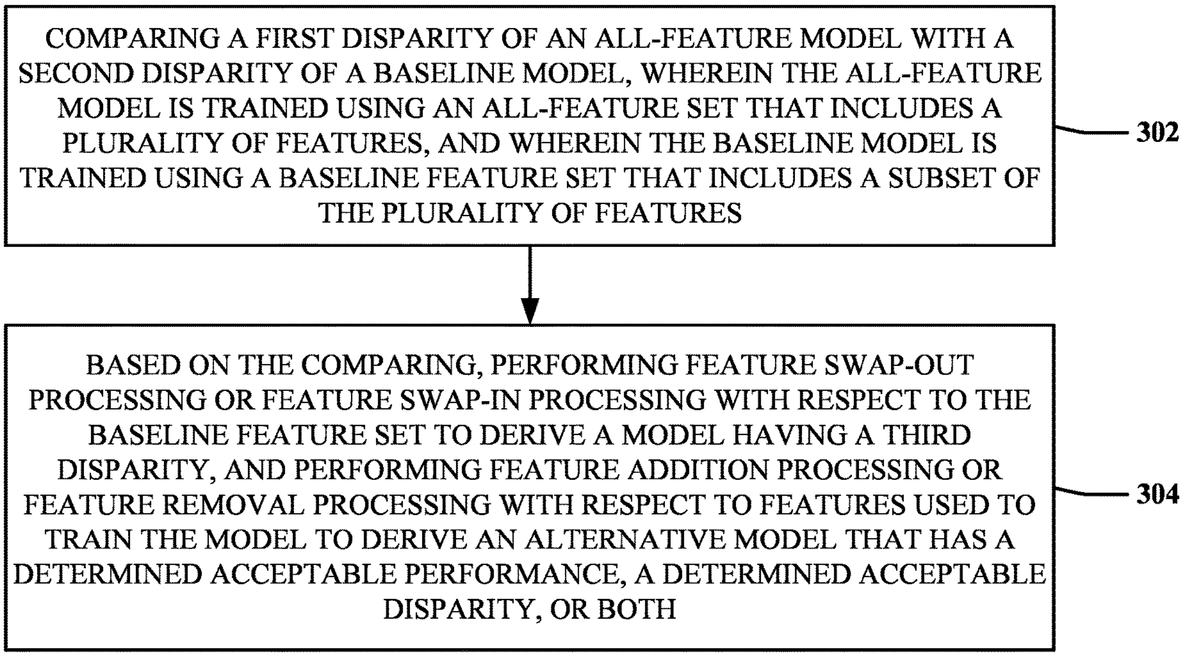
FIG. 3 depicts an illustrative embodiment of a method in accordance with various aspects described herein.

FIG. 3 depicts an illustrative embodiment of a method 300 in accordance with various aspects described herein.

At 302, the method can include comparing a first disparity of an all-feature model with a second disparity of a baseline model, wherein the all-feature model is trained using an all-feature set that includes a plurality of features, and wherein the baseline model is trained using a baseline feature set that includes a subset of the plurality of features. For example, the feature reselection algorithm may, similar to that described above with respect to FIG. 2A, perform one or more operations that include comparing a first disparity of an all-feature model with a second disparity of a baseline model, wherein the all-feature model is trained using an all-feature set that includes a plurality of features, and wherein the baseline model is trained using a baseline feature set that includes a subset of the plurality of features.

At 304, the method can include, based on the comparing, performing feature swap-out processing or feature swap-in processing with respect to the baseline feature set to derive a model having a third disparity, and performing feature addition processing or feature removal processing with respect to features used to train the model to derive an alternative model that has a determined acceptable performance, a determined acceptable disparity, or both. For example, the feature reselection algorithm may, similar to that described above with respect to FIG. 2A, perform one or more operations that include, based on the comparing, performing feature swap-out processing or feature swap-in processing with respect to the baseline feature set to derive a model having a third disparity, and performing feature addition processing or feature removal processing with respect to features used to train the model to derive an alternative model that has a determined acceptable performance, a determined acceptable disparity, or both.

While for purposes of simplicity of explanation, the respective processes are shown and described as a series of blocks in FIG. 3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 4:
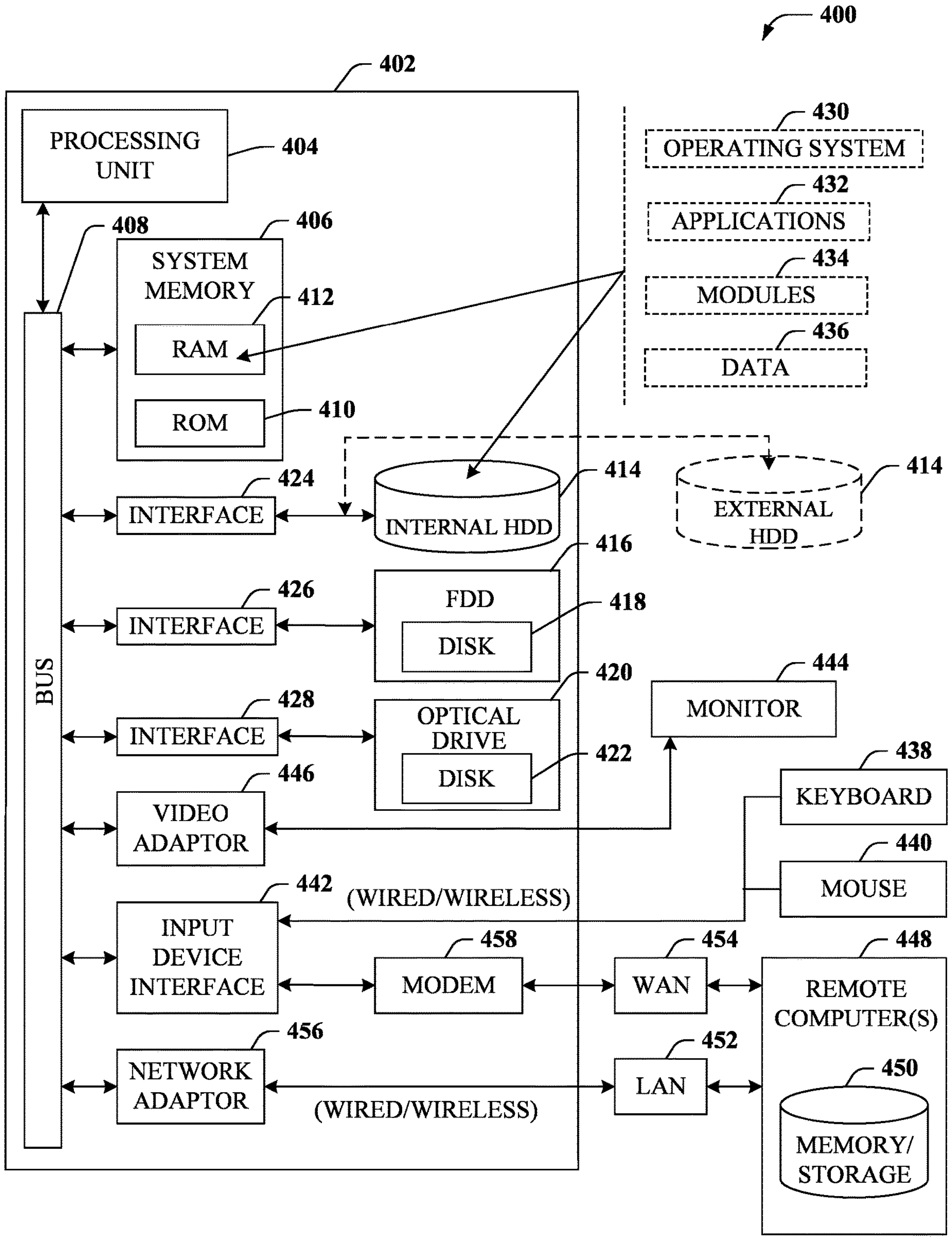
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. For example, computing environment 400 can facilitate, in whole or in part, continuous reduction of model disparity.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

In various embodiments, threshold(s) may be utilized as part of determining/identifying one or more actions to be taken or engaged. The threshold(s) may be adaptive based on an occurrence of one or more events or satisfaction of one or more conditions (or, analogously, in an absence of an occurrence of one or more events or in an absence of satisfaction of one or more conditions).

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. It is also to be understood and appreciated that the subject matter in one or more dependent claims may be combined with that in one or more other dependent claims.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data. Computer-readable storage media can comprise the widest variety of storage media including tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:

a processing system including a processor; and a memory that stores executable instructions that, when executed by the processing system, facilitate performance of operations, the operations comprising:

comparing a first disparity of an all-feature model with a second disparity of a baseline model, wherein the all-feature model is trained using an all-feature set that includes a plurality of features, and wherein the baseline model is trained using a baseline feature set that includes a subset of the plurality of features; and based on the comparing:

performing feature swap-out processing or feature swap-in processing with respect to the baseline feature set to derive a model having a third disparity; and performing feature addition processing or feature removal processing with respect to features used to train the model to derive an alternative model that has a determined acceptable performance, a determined acceptable disparity, or both.

2. The device of claim 1, wherein the comparing involves a determination of whether the first disparity of the all-feature model is worse than the second disparity of the baseline model.

3. The device of claim 1, wherein, responsive to a determination that the first disparity of the all-feature model is worse than the second disparity of the baseline model, the performing the feature swap-out processing or the feature swap-in processing comprises performing the feature swap-out processing to derive the model having the third disparity, and the performing the feature addition processing or the feature removal processing comprises performing the feature addition processing to derive the alternative model.

4. The device of claim 1, wherein, responsive to a determination that the first disparity of the all-feature model is not worse than the second disparity of the baseline model, the performing the feature swap-out processing or the feature swap-in processing comprises performing the feature swap-in processing to derive the model having the third disparity, and the performing the feature addition processing or the feature removal processing comprises performing the feature removal processing to derive the alternative model.

5. The device of claim 1, wherein the operations further comprise computing a disparity per attribute (DPA) value for each feature of the plurality of features based on attribute information and one or more modeler inputs.

6. The device of claim 5, wherein the computing involves computing, for each feature of the plurality of features, a difference between a mean SHapley Additive explanations (SHAP) value for a protected group included in the attribute information and a mean SHAP value for a control group in the attribute information.

7. The device of claim 1, wherein the feature swap-out processing involves:

creating a determined low disparity feature set by removing, from the baseline feature set and according to rank ordering, one or more features that have determined poor disparity for a protected group; and causing the model to be trained using the determined low disparity feature set.

8. The device of claim 1, wherein the feature swap-out processing is performed based on a swap-out limit parameter, a swap-out step size parameter, a correlation or other relationship measure parameter, or a combination thereof.

9. The device of claim 1, wherein the feature addition processing comprises a first stage that involves:

using a determined low disparity feature set corresponding to the model to create individual feature sets that each includes the determined low disparity feature set and a respective feature that was removed from the baseline feature set during the feature swap-out processing;

causing corresponding models to be independently trained based on the individual feature sets;

performing performance and disparity checks for the corresponding models;

based on results of the performance and disparity checks, creating a first candidate feature set that includes features that are determined to improve performance and that are determined to not worsen disparity beyond a tolerance; and causing a first candidate model to be trained based on the first candidate feature set.

10. The device of claim 9, wherein the feature addition processing further comprises a second stage that involves:

using the first candidate feature set to create additional individual feature sets that each includes the first candidate feature set and a respective feature that is not included in the baseline feature set;

causing additional models to be independently trained based on the additional individual feature sets;

performing additional performance and disparity checks for the additional models;

based on results of the additional performance and disparity checks, creating a second candidate feature set that includes features that are determined to improve performance and that are determined to not worsen disparity beyond a tolerance; and causing a second candidate model to be trained based on the second candidate feature set.

11. The device of claim 10, wherein the feature addition processing further comprises repeating the first stage and the second stage based on an iteration limit.

12. The device of claim 1, wherein the feature swap-in processing involves:

creating a determined low disparity feature set by adding, to the baseline feature set and according to rank ordering, one or more features that have determined good disparity for a protected group; and causing the model to be trained using the determined low disparity feature set.

13. The device of claim 1, wherein the feature removal processing comprises a first stage that involves:

using a determined low disparity feature set corresponding to the model to create individual feature sets that each includes the determined low disparity feature set less a respective feature that was added in during the feature swap-in processing;

causing corresponding models to be independently trained based on the individual feature sets;

performing performance and disparity checks for the corresponding models;

based on results of the performance and disparity checks, creating a first candidate feature set that excludes features that are determined not to improve performance or that are determined to worsen disparity beyond a tolerance; and causing a first candidate model to be trained based on the first candidate feature set.

14. The device of claim 13, wherein the feature removal processing further comprises a second stage that involves:

using the first candidate feature set to create additional individual feature sets that each includes the first candidate feature set less a respective feature that is included in the baseline feature set;

causing additional models to be independently trained based on the additional individual feature sets;

performing additional performance and disparity checks for the additional models;

based on results of the additional performance and disparity checks, creating a second candidate feature set that excludes features that are determined not to improve performance or that are determined to worsen disparity beyond a tolerance; and causing a second candidate model to be trained based on the second candidate feature set.

15. The device of claim 1, wherein the operations further comprise causing the alternative model to undergo hyperparameter tuning to derive a hyperparameter tuned alternative model.

16. A non-transitory machine-readable medium, comprising executable instructions that, when executed by a processing system including a processor, facilitate performance of operations, the operations comprising:

comparing a first disparity of an all-feature model with a second disparity of a baseline model; and based on the comparing:

performing feature swap-out processing or feature swap-in processing with respect to a baseline feature set associated with the baseline model to derive a model having a third disparity; and performing feature addition processing or feature removal processing with respect to features used to train the model to derive an alternative model that has a determined acceptable performance and a determined acceptable disparity.

17. The non-transitory machine-readable medium of claim 16, wherein the all-feature model is trained using an all-feature set that includes a plurality of features, and wherein the baseline feature set includes only a subset of the plurality of features.

18. The non-transitory machine-readable medium of claim 16, wherein the feature swap-out processing, the feature swap-in processing, or both involve clustering or grouping of features that are determined to be correlated or that have a relationship measure that satisfies a threshold.

19. A method, comprising:

comparing, by a processing system including a processor, a first disparity of a feature model with a second disparity of a baseline model, wherein a number of features associated with the feature model is greater than a number of features associated with the baseline model; and based on the comparing:

performing, by the processing system, feature swap-out processing or feature swap-in processing with respect to the features associated with the baseline model to derive a model having a third disparity;

performing, by the processing system, feature addition processing or feature removal processing with respect to features used to train the model to derive a candidate model that has determined acceptable performance, determined acceptable disparity, or both; and causing, by the processing system, the candidate model to undergo hyperparameter tuning to derive an alternative model to the feature model.

20. The method of claim 19, wherein the feature model comprises an all-feature model that includes all available features, and wherein one or more of the feature swap-out processing, the feature swap-in processing, the feature addition processing, and the feature removal processing involve evaluations of trained models based on a performance-related parameter and a disparity-related parameter.

* * * * *